United States Patent
Kim

(10) Patent No.: US 12,282,573 B2
(45) Date of Patent: Apr. 22, 2025

(54) FILE SYSTEM PROTECTION APPARATUS AND METHOD IN AUXILIARY STORAGE DEVICE

(71) Applicant: Deok Woo Kim, Seoul (KR)

(72) Inventor: Deok Woo Kim, Seoul (KR)

( * ) Notice: Subject to any disclaimer, the term of this patent is extended or adjusted under 35 U.S.C. 154(b) by 601 days.

(21) Appl. No.: 17/596,055

(22) PCT Filed: Apr. 27, 2020

(86) PCT No.: PCT/KR2020/005514
§ 371 (c)(1),
(2) Date: Jul. 19, 2022

(87) PCT Pub. No.: WO2020/246711
PCT Pub. Date: Dec. 10, 2020

(65) Prior Publication Data
US 2022/0374534 A1    Nov. 24, 2022

(30) Foreign Application Priority Data

Jun. 3, 2019  (KR) .......... 10-2019-0065490

(51) Int. Cl.
| | | |
|---|---|---|
| G06F 21/00 | (2013.01) | |
| G06F 21/10 | (2013.01) | |
| G06F 21/31 | (2013.01) | |
| G06F 21/62 | (2013.01) | |

(52) U.S. Cl.
CPC .......... *G06F 21/6218* (2013.01); *G06F 21/10* (2013.01); *G06F 21/31* (2013.01)

(58) Field of Classification Search
CPC ....... G06F 21/10; G06F 21/31; G06F 21/6218
See application file for complete search history.

(56) References Cited

U.S. PATENT DOCUMENTS

| | | | |
|---|---|---|---|
| 2006/0272017 A1 | 11/2006 | Largman et al. | |
| 2010/0165808 A1* | 7/2010 | Harada | ................ G11B 27/034 |
| 2014/0101777 A1* | 4/2014 | Kim | ........................ G06F 21/62 726/27 |

(Continued)

FOREIGN PATENT DOCUMENTS

| | | |
|---|---|---|
| JP | 2001-75855 A | 3/2001 |
| JP | 2003-208269 A | 7/2003 |

(Continued)

OTHER PUBLICATIONS

International Search Report for PCT/KR2020/005514 dated Aug. 13, 2020 [PCT/ISA/210].

*Primary Examiner* — Joseph P Hirl
*Assistant Examiner* — Chi D Nguy
(74) *Attorney, Agent, or Firm* — Sughrue Mion, PLLC

(57) ABSTRACT

A file system protection technology, which can be applied to an auxiliary storage device, and an apparatus and method for protecting a file system in a manner of blocking or warning, in advance, about an access to a file system or a change of the file system and identifying permission of a user as necessary re disclosed. A control device (60) is connected to a host interface (30), a data storage device (40), and a user input device (50) to control an operation mode of the auxiliary storage device or manage and protect a file system object to be protected, according to a user command.

20 Claims, 5 Drawing Sheets

(56) References Cited

U.S. PATENT DOCUMENTS

| | | | |
|---|---|---|---|
| 2015/0040246 A1* | 2/2015 | Yuen | .................... H04L 63/0876 |
| | | | 726/30 |
| 2015/0350206 A1 | 12/2015 | Shin et al. | |
| 2018/0075236 A1 | 3/2018 | Kwon et al. | |
| 2018/0181761 A1* | 6/2018 | Sinha | .................... G06F 21/577 |
| 2021/0089405 A1* | 3/2021 | Kim | .................... G06F 11/1469 |

FOREIGN PATENT DOCUMENTS

| | | | |
|---|---|---|---|
| JP | 2008-299376 A | 12/2008 | |
| JP | 2016-186708 A | 10/2016 | |
| KR | 10-1992-0020324 A | 11/1992 | |
| KR | 10-0373526 B1 | 2/2003 | |
| KR | 10-2003-0090568 A | 11/2003 | |
| KR | 10-2011-0104481 A | 9/2011 | |
| KR | 10-1920866 B1 | 11/2018 | |
| WO | 2016/185868 A1 | 11/2016 | |

* cited by examiner

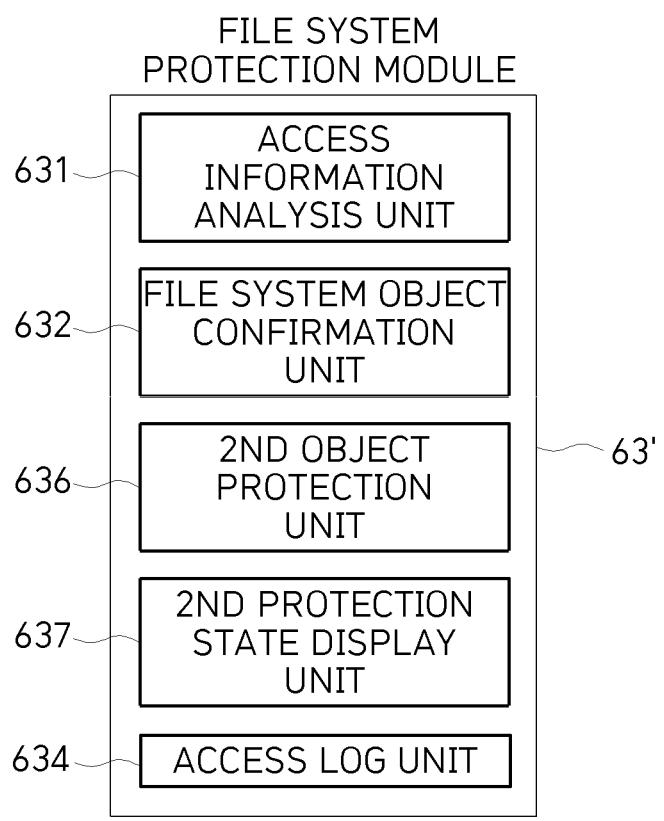

FILE SYSTEM PROTECTION APPARATUS AND METHOD IN AUXILIARY STORAGE DEVICE

CROSS REFERENCE TO RELATED APPLICATIONS

This application is a National Stage of International Application No. PCT/KR2020/005514 filed Apr. 27, 2020, claiming priority based on Korean Patent Application No. 10-2019-0065490 filed Jun. 3, 2019.

TECHNICAL FIELD

The present invention relates to an auxiliary storage device used in a computation machine or computer, and more particularly, to an apparatus and method for protecting a file system stored in an auxiliary storage device.

BACKGROUND ART

In any computers including personal computers, an operating system (OS) is stored in an auxiliary storage device implemented by non-volatile memories or mechanical storage device, and a basic input/output system (BIOS) boots the computer by reading the OS from the auxiliary storage device when in computer booting. Also, user files and application programs should be stored in the auxiliary storage device. Accordingly, it is essential to utilize an auxiliary storage device for operation of a computer. Therefore, the configuration of an OS and user files should not be changed except by legitimate users.

However, in the existing computer system, there is no particular way to distinguish legitimate users from others, after a security process using an ID and password is passed. For example, Windows OS generally adopts a security policy that restricts access to folders or files by classifying users. However, unlimited privileges are given to administrators, and therefore, the Windows OS cannot cope with what malicious programs infiltrate and operate as an administrator, or what a malicious third party temporarily gains access as an administrator and harms the system or steals information contained in the computer.

For this reason, in continuously some cases, malicious codes such as ransomware not only encrypt user files but also delete partitions or folders containing system recovery information, but there is no countermeasure against this. It is also common for unauthorized third parties to steal information by covertly copying files containing confidential company information.

For recovering the system damage among those problems, the present inventor has filed patent applications on several inventions (Korean Application No. 10-2017-0057998, and Korean Patent No. 10-1920866 and No. 10-1920867). The prior patent applications deal with an auxiliary storage device including an original auxiliary storage device and a backup auxiliary storage device. The original auxiliary storage device is always accessible by a host computer, while the backup auxiliary storage device is limited so that a user's access is possible only under certain conditions, e.g., in a recovery mode. Therefore, safe backup and recovery can be accomplished by using the prior patent applications.

However, since only backup and recovery of a file system is possible, the prior patent applications have a weakness in that only a reactive action is possible. Of course, there is no big problem because the reactive recovery can be done perfectly, but it is possible to prevent malicious attempts from the beginning because the time and cost required to recover from system damage can be eliminated or significantly reduced.

Meanwhile, in the case of existing computers, malicious code monitoring programs mainly perform a monitoring task by comparing a portion of the code to a malicious code database. However, when code is changed or is not in the malicious code database, the code cannot be monitored, and thus inevitably, there is bound to be damage. In addition, even when a method of monitoring the operation of a specific program is utilized, malicious code may incapacitate a corresponding program which further increases the damage. Therefore, when malicious code or an unauthorized third party accesses a file system and then attempts to change its configuration or copy information contained in a file or the like, how to effectively block the attempt may be significantly meaningful for protecting the file system.

DISCLOSURE

Technical Problem

Accordingly, the present inventor has developed a file system protection apparatus and method which are applicable not only to an auxiliary storage device including an original auxiliary storage device and a backup auxiliary storage device described in the patent applications that were filed earlier by the present inventor, but also to the existing auxiliary storage devices. Accordingly, it is a purpose of the present invention to propose an apparatus and method for protecting a file system by blocking or warning against access to a file system or change in the configuration of a file system and by confirming a user's permission when necessary.

Technical Solution

To achieve the above purpose, the present invention analyzes information of a host computer that accesses an auxiliary storage device to specify a file system object included in a file system, and then selectively either rejects or accepts access with a user's additional consent when the file system object is an object to be protected so as to protect the file system.

In general, the auxiliary storage device operates, such as a read or write operation, using access information received from the host computer. At this time, the host computer accesses the auxiliary storage device by designating the address of a data area that needs to be accessed, mainly by Cylinder Head Sector (CHS) Addressing or Logical Block Addressing (LBA) rather than a file name or folder name.

As a result, any method uses an address that directly or indirectly designates a specific area (cluster number, head number, sector number, etc.) of a storage space because the file system of the host computer is managed by the host computer, not the auxiliary storage device. Of the matter of course, although some auxiliary storage devices may send and receive even file-level information using a separate protocol, generally HDD (Hard Disk Drive) or SSD (Solid State Drive) widely utilized in desktop PCs or laptops accesses an auxiliary storage device by direct addressing method.

However, since access information delivered at this time generally does not contain information such as file names or file paths, the access information should be analyzed by the auxiliary storage device in order to check whether to access file system objects such as files, directories, Master Boot Record (MBR), etc. On the other hand, such operation is unnecessary in general auxiliary storage devices, and if such operation is performed, only the processing speed of the auxiliary storage devices is reduced and so there is no benefit.

In contrast, since the auxiliary storage device according to the present invention performs such operation, it is possible to prevent unauthorized changes of a file system, even though the processing speed is slightly decreased, thereby being able to protect the file system from attacks of malicious viruses or malicious codes such as ransomware. Also, the auxiliary storage device according to the present invention can avoid delays in response due to delays in database update or the emergence of new malicious codes since a malicious code database is not used. In addition, if a malicious code or an unauthorized third party accesses a file system, it is possible to greatly improve the security of the file system by blocking the access or processing the access after confirming a user's permission.

An auxiliary storage device according to a first aspect of the present invention, which embodies the above concept for solving the above problem, includes a host interface for communicating with a host computer, a data storage device for storing data, a user input device for receiving an input for an operation mode of the auxiliary storage device, i.e., a normal mode and a management mode and related information from a user, and a control device, connected to the host interface, the data storage device, and the user input device, to control the operation mode of the auxiliary storage device and manage and protect a file system object to be protected according to a user's command.

The control device according to an embodiment controls the operation of the auxiliary storage device in the management mode or the normal mode according to information received from the user input device. When the operation mode is the management mode, the user may designate a file system object to be protected and set a protection type, and these information set by the user (an object to be protected and a protection type) is stored in a database of objects to be protected (hereinafter, called "object DB to be protected"). In the case that the operation mode is the normal mode, when the access of the host computer targets a file system object listed in the object DB to be protected, a protection operation is performed with reference to the protection type for the object DB to be protected. In the normal mode, the host computer cannot access the object DB to be protected where the information set by the user is stored. Thus, it is possible to prevent a malicious code from changing or damaging the object DB to be protected.

The control device may be implemented with a CPU that controls the auxiliary storage device and related hardware or software. The user input device may be implemented with electrical switches manipulated by a user. On the other hand, the user input device may be configured as a communication module and implemented by checking a single or a plurality of user input or data on the basis of information received by wire or wirelessly. In this case, an input device of an external terminal may substantially replace the user input device of the present invention.

Also, according to another embodiment, the control device may additionally include an object DB to be protected management module (also called as the object DB management module) and a file system protection module.

Here, when the auxiliary storage device is in the management mode, the object DB management module performs a function of receiving a user's input and creating or changing the object DB to be protected. In this case, the user's information may be input by the user input device, or may be input to the object DB management module of the auxiliary storage device through the host interface using an auxiliary storage device management program performed by the host computer under a limited environment (e.g., after setting the management mode through the user input device of the auxiliary storage device). The user may designate a file system object to be protected as an object to be protected and also may designate a protection type.

Here, the protection types of the object to be protected include "warning," "permission confirmation," "permission confirmation and recovery information storage," and "access rejection." Here, the recovery information storage is applicable when an inaccessible storage area of the host computer is provided together, such as including an original auxiliary storage device and a backup auxiliary storage device in a manner similar to the prior invention of the present inventor.

Also, the file system protection module that may be included in the control device may include an access information analysis unit configured to analyze access information provided by the host computer, a file system object confirmation unit configured to confirm a file system object that is using a storage space of an access address included in the access information, and an object protection unit configured to selectively process access to the access address according to the protection type designated by the user when the confirmed file system object is the object to be protected designated by the user. Also, the file system protection module may further include an access log unit for creating and storing log information composed of an access time, an address, a command type, etc.

An auxiliary storage device according to a second aspect of the present invention for solving the above problems additionally includes a display device for displaying a processing state (e.g., the type of file system object and an access processing result) of the control device in addition to the elements of the auxiliary storage device of the first aspect. The control device of the auxiliary storage device according to the second aspect is configured to include a display device driving module for driving the display device and thus includes a file system protection module with some added functions.

Here, the file system protection module may include an access information analysis unit configured to analyze access information provided by the host computer, a file system object confirmation unit configured to confirm a file system object that is using a storage space of an access address included in the access information, an object protection unit configured to selectively process access to the access address according to the protection type designated by the user when the confirmed file system object is the object to be protected designated by the user, and a protection state display unit configured to enable a display device driving module to output a type of the file system object and an access process result to the display device.

Also, an auxiliary storage device according to a third aspect of the present invention for solving the above problems further includes a user permission confirmation input unit for receiving a user permission confirmation input from the user input device, in addition to the elements of the auxiliary storage device of the second aspect. The user permission confirmation input unit processes that for a user to input whether to permit access to a corresponding address or a file system object when the protection type of the file system object is "permission confirmation" or "permission confirmation and recovery information storage."

A file system protection module of a control device of an auxiliary storage device according to a third aspect may include an access information analysis unit configured to analyze access information provided by the host computer, a file system object confirmation unit configured to confirm a file system object that is using a storage space of an access address included in the access information, a second protection state display unit configured to enable a display device driving module to output a type of the file system object and a permission request to the display device when the confirmed file system object is the object to be protected designated by the user and the protection type is "permission confirmation" or "permission confirmation and recovery information storage," and a second object protection unit configured to perform access when a user permission confirmation input is received from the user input device.

The protection state display unit of the control device of the second aspect and the second protection status display unit and the user input device of the control device of the third aspect, may be connected to an external terminal device such as a mobile phone. That is, if a wired/wireless communication module is included in the user input device and connected to a mobile phone and an app. is installed and operated on the mobile phone, it is possible to integrally implement tasks of managing the object DB to be protected and displaying and permitting access to a file system objects.

Meanwhile, according to another aspect of the present invention, a computer (including PC, server computer, mobile terminal, etc.) employing an auxiliary storage device, to which the above-described file system protection device in the auxiliary storage device or the above-described file system protection type in the auxiliary storage device is applied, is provided.

The configuration and operation of the present invention introduced above will become obvious through specific embodiments described later with the drawings.

Advantageous Effects

While the inventor's prior invention focuses on the recovery of a damaged file system, the auxiliary storage device to which the technology according to the present invention is applied can prevent or warn against an unintended change in configuration of a file system. Thus, it is possible to protect the file system from attacks by malicious codes such as malicious viruses or ransomware. In addition, even when a malicious third party temporarily gains access rights to access or harm a system, an appropriate countermeasure is possible, and thus advantageously, it is possible to provide a significant level of file system protection.

In addition, the file system can be protected without many problems of existing anti-virus programs, for example, the problem that, when a new malicious code appears, it is impossible to cope with it until the malicious code is registered in a database or the problem that a host computer is slowed by always running a program that checks for a malicious code. Thus, it is possible to prevent data damage in advance by malicious code without any inconvenience such as updating the malicious code database from time to time or reduction of the performance of the host computer.

DESCRIPTION OF DRAWINGS

FIG. 9 is a block diagram of a file system protection module of the control device according to the third embodiment.

BEST MODES

Figure 1:
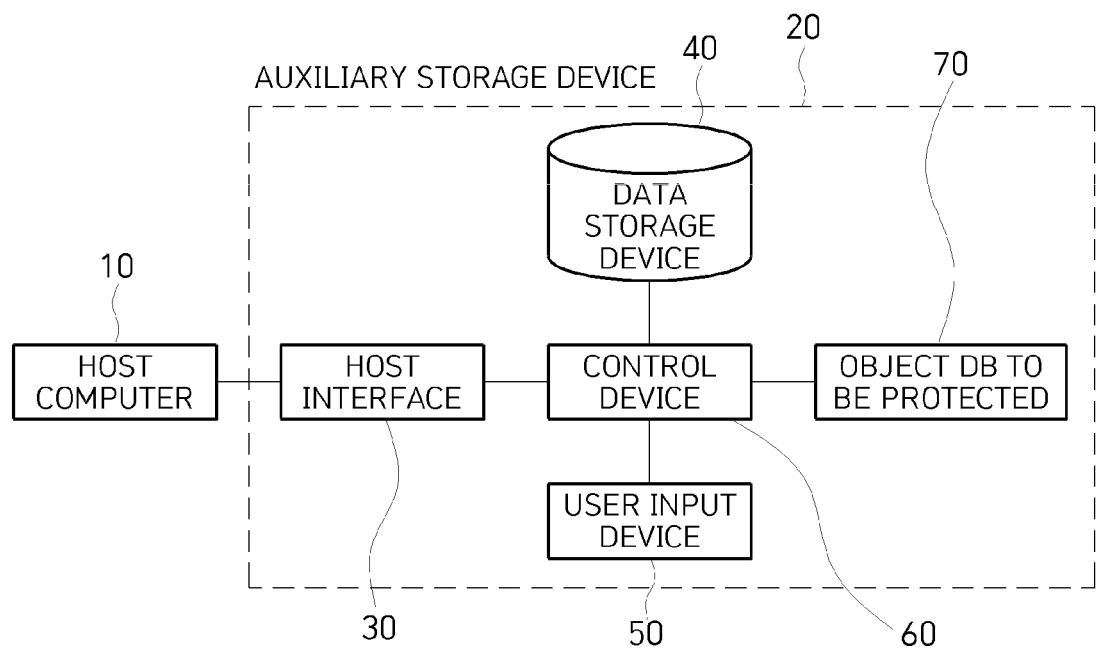
FIG. 1 is a schematic diagram of an auxiliary storage device according to a first embodiment of the present invention.

Advantages and features of the present invention and implementation methods thereof will be clarified through the following embodiments described in detail with reference to the accompanying drawings. However, the present invention is not limited to embodiments disclosed herein and may be implemented in various different forms. The embodiments are provided for making the disclosure of the prevention invention thorough and for fully conveying the scope of the present invention to those skilled in the art. It is to be noted that the scope of the present invention is defined by the claims.

The terminology used herein is for the purpose of describing particular embodiments only and is not intended to be limiting of the invention. Herein, the singular shall be construed to include the plural, unless the context clearly indicates otherwise. The terms "comprises" or "comprising" as used herein specify the presence of stated elements, steps, operations, and/or components but do not preclude the presence or addition of one or more other elements, steps, operations, and/or components.

Hereinafter, the preferred embodiments of the present invention will be described in detail with reference to the accompanying drawings. In adding reference numerals to the elements of each drawing, the same elements are given the same reference numerals as much as possible even if they are shown on different drawings. In the description of the present invention, detailed descriptions of related known elements or functions will be omitted if they may obscure the gist of the present invention.

FIG. 1 is a schematic diagram of an auxiliary storage device 20 according to a first embodiment of the present invention. Basically, a host computer 10 is configured to access the auxiliary storage device 20. The auxiliary storage device 20 includes a host interface 30 for communicating with a host computer, a data storage device 40 for storing data, a user input device 50 for receiving a user input, and a control device 60, connected to the host interface 30, the data storage device 40, and the user input device 50, to control operation modes of the auxiliary storage device or to manage and protect a file system object to be protected according to a user command.

The control device 60 includes an operation mode control module (61 in FIG. 2) to control the operation modes (normal mode and management mode) of the auxiliary storage device 20. The normal mode and the management mode may be selected by a user through the user input device 50. When the operation mode of the auxiliary storage device 20 is the management mode, a user may designate file system objects to be protected and set a protection type, and the information set by the user is stored in an object DB to be protected 70. In the normal mode, when the access of the host computer targets a file system object listed in the object DB to be protected 70, a protection operation is performed with reference to the protection type of the object DB to be protected. In the normal mode, the host computer cannot access the object DB to be protected 70 set by the user in a setting mode, thereby preventing malicious code from changing or damaging the object DB to be protected 70.

Here, the file system object basically refers to an element, or a combination of elements, included in the file system. Therefore, the file system object may be a sector, a cluster, a file path, a file name, a directory, partition, or a drive itself and may be a combination thereof. Accordingly, an element included in the file system itself, namely, Master Boot Record (MBR), Partition Boot Record (PBR), and Master File Table (MFT) in the case of NTFS and also File Allocation Table (FAT) in the case of FAT file system, may be a file system object. Therefore, the file system object may be a storage space such as a sector or cluster designated by CHS or LBA, may refer to a specific file such as "c:/users/documents/PEACE.doc", may refer to files or the entirety of a directory indicating temporary use such as "/temporary", may be a partition or drive such as drive D:, or may be a cluster such as MBR.

The control device 60 may be implemented with a central processing unit (CPU) that controls the auxiliary storage device 20 and related hardware or software. The user input device 50 may be implemented with electrical switches manipulated by a user. On the other hand, the user input device 50 may include a communication module to use the information received by wire or wirelessly, so that it may check a single or a plurality of user input or data. In this case, an input device of an external terminal may substantially replace the user input device 50. For example, a touch screen or key inputter of a mobile phone may be connected to the auxiliary storage device 20 through a communication scheme such as Bluetooth to replace the user input device 50. In this case, it is preferable to be careful not to block exposure to the outside by adopting a security protocol.

Figure 2:
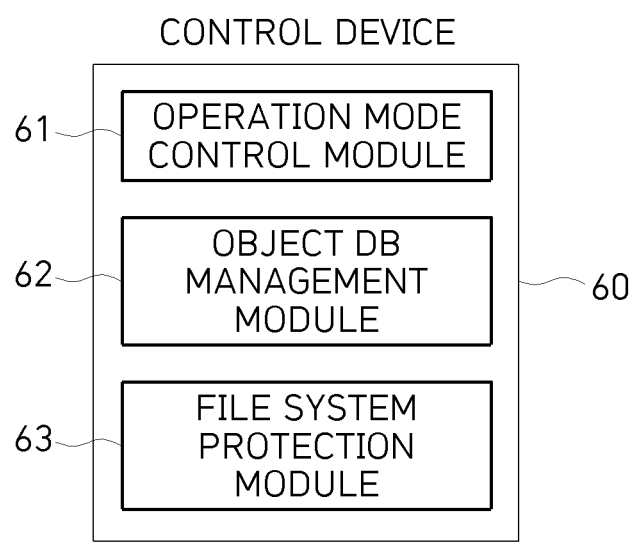
FIG. 2 is a block diagram of a control device of the auxiliary storage device according to the first embodiment.

In FIG. 2, the control device 60 further includes an object DB to be protected management module (hereinafter, "object DB management module") 62 and a file system protection module 63 in addition to the operation mode control module 61.

The object DB management module 62 performs a function of receiving a user's input and creating or changing the object DB to be protected 70 when the auxiliary storage device 20 is in the management mode. The user may designate a file system object to be protected as an object to be protected and also may designate a protection type. In this case, the user's information may be input by the user input device 50, or may be input to the object DB management module 62 through the host interface 30 bu using an auxiliary storage device management program performed by the host computer 10 under a limited environment (e.g., after setting the management mode through the user input device of the auxiliary storage device). In the case of using such a method, if use environment is not restricted, there may be an attack by malicious code utilizing the unrestricted use environment, and so caution is required. However, since such a method is easy to use, it is preferable to use the method after the management mode is selected in the auxiliary storage device.

The protection types include "warning," "permission confirmation," "permission confirmation and recovery information storage," and "access rejection." Here, the recovery information storage is applicable when an inaccessible storage area of the host computer 10 is provided together, such as including an original auxiliary storage device and a backup auxiliary storage device in a manner similar to the prior invention of the present inventor. The designation of the protection type of the object to be protected is also possible by providing the user with means such as an initialization program or a management program as described above. Meanwhile, the protection type may be set to distinguish whether the access of the host computer 10 is write or read. Therefore, for example, the user can create the object DB to be protected 70 as follows. It is preferable that the files or directories registered in the object DB to be protected 70 are automatically updated when their names are changed, but the files or directories may be restricted so that the name change is impossible.

A configuration example of the object DB to be protected 70 is shown below. In the DB configuration example below, the type of object can be expressed as an address like LBA0-LBA33, a file path and file name like D:/PEACE.doc, or a directory like D:/WORLD. In the examples, write access of Master Boot Record (MBR) responsible for booting in the case of an NTFS partition and LBA0-LBA33 responsible for booting in the case of a GPT (GUID Partition Table) partition is prohibited.

| NAME/ADDRESS | READ_PROTECT | WRITE_PROTECT |
|---|---|---|
| LBA0-LBA33 | Warning | Access rejection |
| MBR | Warning | Access rejection |
| D:/PEACE.doc | — | Permission confirmation |
| D:/WORLD | — | Warning |
| D:/SEOUL.doc | Permission confirmation | Permission confirmation and recovery information storage |
| C:/TREE.doc | Warning | Warning |

The "warning" is simply implemented by notifying a user that there has been access to the file system object, through a light-emitting diode (LED), an alarm, or a display device. The "permission confirmation," which is to accept access only when the user's permission is received, may be implemented by outputting a message for permission confirmation to a display device and by receiving permission confirmation through the user input device 50, or may be implemented by automatically determining that permission is confirmed when a specific switch is in the ON state or when a value input through other communication terminals corresponds to the ON state. The "access rejection," which is to reject access unconditionally, is implemented by notifying a user that access to the file system object is rejected, through an LED, an alarm, or a display device after the access is rejected. The "permission confirmation and recovery information storage" is implemented by accepting access with the user's permission and thereafter storing recovery information to prepare for damage to the file system object. In this case, the recovery information storage is possible only when an inaccessible storage area of the host computer is provided together in a normal situation.

Next, since file system objects are usually composed of a plurality of clusters or sectors, the user answer confirmed may be stored and used to automatically process access to the clusters constituting the file system object. That is, by receiving a user answer once and adopting the same answer for all clusters constituting a corresponding file for a certain period of time, it is possible to exclude an unnecessary user confirmation task.

Meanwhile, when the access is read access, only permission confirmation or warning among the above-described protection types is applicable. In particular, in the case of read access, permission confirmation is a method that can prevent an unauthorized third party from attempting to leak the information by secretly copying files. In this case, a user's permission required for the permission confirmation may use a simple switch input (e.g., through the user input device 50). However, the permission confirmation may also be triggered by an approval signal input from the user's mobile phone to the control device (e.g., a method in which an app. of the mobile phone and the control device are automatically connected to enable a separate password to be automatically input from the mobile phone). That is, a communication terminal function is given to the user input device 50 of the auxiliary storage device 20, and an app capable of communicating with the auxiliary storage device 20 and operating as the user input device 50 is installed on the mobile phone. Thus, when the mobile phone and the auxiliary storage device 20 are connected to each other, it is possible to process (automatically approve) the permission confirmation without the user's intervention. At this time, the app installed on the mobile phone may be linked with the auxiliary storage device by receiving a separate password from the user or by being activated using the mobile phone's unique device number, USIM id, etc.

Also, in the case of write access, it is preferable to perform permission confirmation in a different way from the permission confirmation by the automatic approval of read access. That is, in the case of write access, the change in configuration of the file system has to be accompanied, so the automatic approval in the case of read access may result in approving the attack of malicious codes. Accordingly, it is preferable that the automatic approval in the case of write access be used only for the permission confirmation and recovery information storage.

Figure 3:
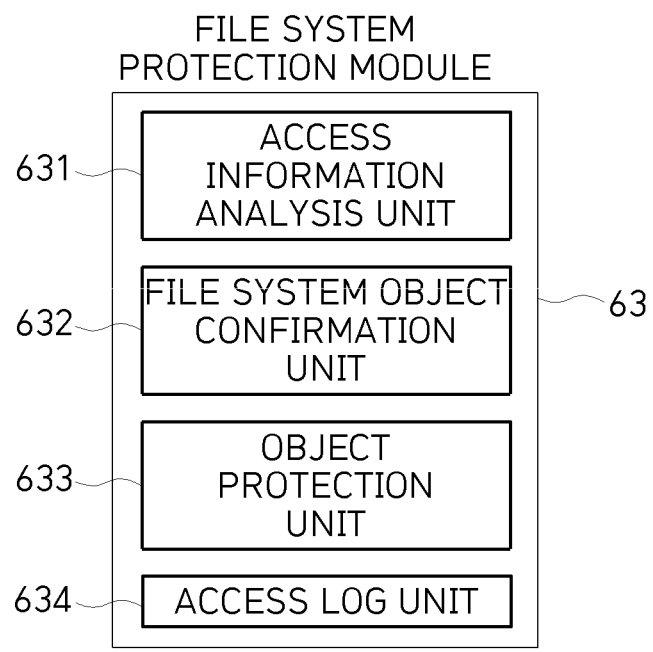
FIG. 3 is a block diagram of a file system protection module of the control device according to the first embodiment.

FIG. 3 is a block diagram of the file system protection module 63 in the control device 60 shown in FIG. 2. The file system protection module 63 may be configured to include an access information analysis unit 631 for analyzing access information provided by the host computer 10, a file system object confirmation unit 632 for confirming a file system object that is using a storage space of an access address included in the access information, and an object protection unit 633 for selectively processing access to the access address according to a protection type designated by a user when the confirmed file system object is an object to be protected designated by the user.

In addition to the configuration, the file system protection module 63 may further include an access log unit 634 for creating and storing log information composed of an access time, an address, a command type, etc. Using this access log unit 634, the user may manage the log information through an app. of a mobile phone.

Figure 4:
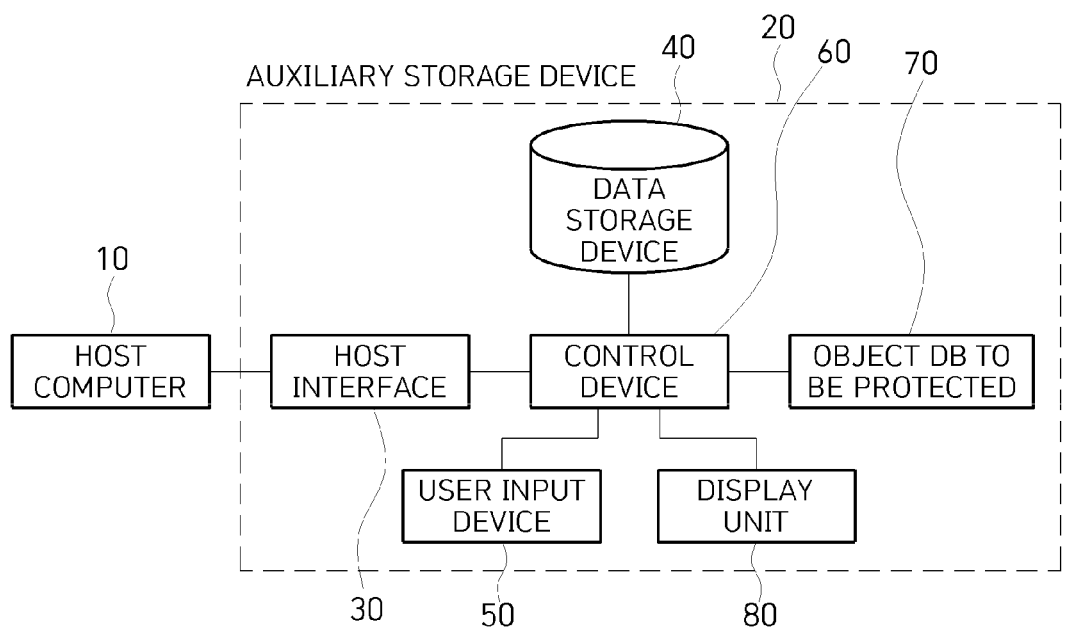
FIG. 4 is a block diagram of an auxiliary storage device according to a second embodiment of the present invention.

FIG. 4 is a block diagram of an auxiliary storage device according to a second embodiment of the present invention. A display device 80 is added in the auxiliary storage device 20 of the first embodiment of FIG. 1. Here, the display device 80 may be configured using an LED, a display, an alarm device, or their combination. In another embodiment, the display device 80 may be configured by an external terminal device and a communication module in a manner similar to the user input device 50 to deliver information to the outside by wire or wirelessly. It is also possible to integrate the user input device 50 and the display device 80 into a single input/output device. In this case, the integrated input/output device may be implemented as a whole or a part of a terminal that is communicatively connected to the control device 60 (i.e., connected over a communication network or connected by a specially designed communication means or method).

Figure 5:
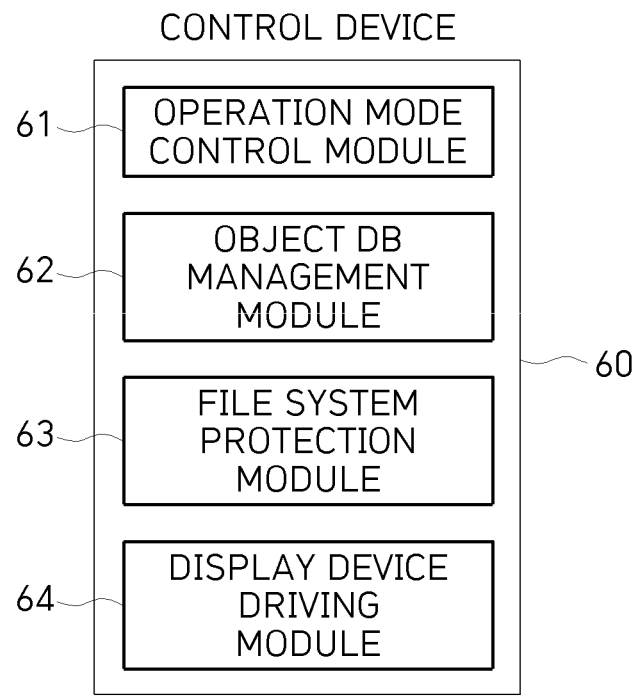
FIG. 5 is a block diagram of a control device of the auxiliary storage device according to the second embodiment.

FIG. 5 is a block diagram of the control device 60 of the auxiliary storage device according to the second embodiment shown in FIG. 4. In addition to the elements shown in FIG. 2, a display device driving module 64 for driving the display device 80 is further included. Also, referring to FIG. 6, the file system protection module 63 additionally includes a protection state display unit 635 for enabling the display device driving module 64 to indicate the type of file system object and an access processing result to the display device 80, in addition to an access information analysis unit 631 for analyzing access information provided by the host computer 10, a file system object confirmation unit 632 for confirming a file system object that is using a storage space of an access address included in the access information, and an object protection unit 633 for selectively processing access to the access address according to a protection type designated by a user when the confirmed file system object is an object to be protected designated by the user, as shown in FIG. 3.

Also, as in the case of the first embodiment, the file system protection module 63 may include an access log unit 634 for creating and storing log information composed of an access time, an address, a command type, etc. Using this access log unit 634, the user may manage the log information through an app. of a mobile phone.

In the second embodiment, the protection state display unit 635 may be connected to an external terminal device such as a mobile phone and implemented to deliver or exchange information, wherein the connection may be implemented using a communication network (i.e., using a communication network or using a specially designed communication means or method). In this case, substantially, the screen of the mobile phone will be the display device 80, and the input means of the mobile phone will be the user input device 50, and an app. Installed in the mobile phone will process the display and input operations. In this case, the control device 60 will be connected to the mobile phone through a communication module, and the above-described log information management will also be possible with this app.

An example of the above-described objet DB to be protected 70 will be described. In the example, a user has designated MBR as an object to be protected, and a write protection type is "access rejection." Now, it is assumed that the host computer 10 is infected with a computer virus and the virus attempts to corrupt the MBR in order to disable booting. If the virus of the host computer 10 issues a write command to a sector 0 of the MBR, the auxiliary storage device 20 first confirms that the sector 0 belongs to the file system object MBR through a file system object confirmation process. Subsequently, the auxiliary storage device 20 confirms that a write operation for the MBR is rejected by checking the object DB to be protected 70. Accordingly, the auxiliary storage device 20 rejects a write command of the host computer 10 and notifies the user of this, through the display device 80. In this case, the display device 80 may be the screen of the mobile phone in which the app. is running as described above. That is, when such a warning situation occurs, the app. is automatically activated to notify the user that the MBR is about to be changed or damaged by the write command. In this case, the user may view the log information through the app. Therefore, the user can perceive an abnormal operation of the host computer 10 by collecting such information, and thus the user may check the abnormality of the host computer 10 by running an anti-virus program or by other methods.

The "access rejection" can also be reported to the host computer in other ways. As an example: In the case of Windows OS, if an error occurs in the write operation, bad sectors are checked by executing the "chkdsk" program, which may greatly affect the operation of the host computer. Thus, it may be only reported to the host computer that the write operation is successful, and the auxiliary storage device, through the protection state display unit 635, may display only that access is rejected. However, if the OS supports the function of the present invention, this implementation method will not be necessary.

Figure 7:
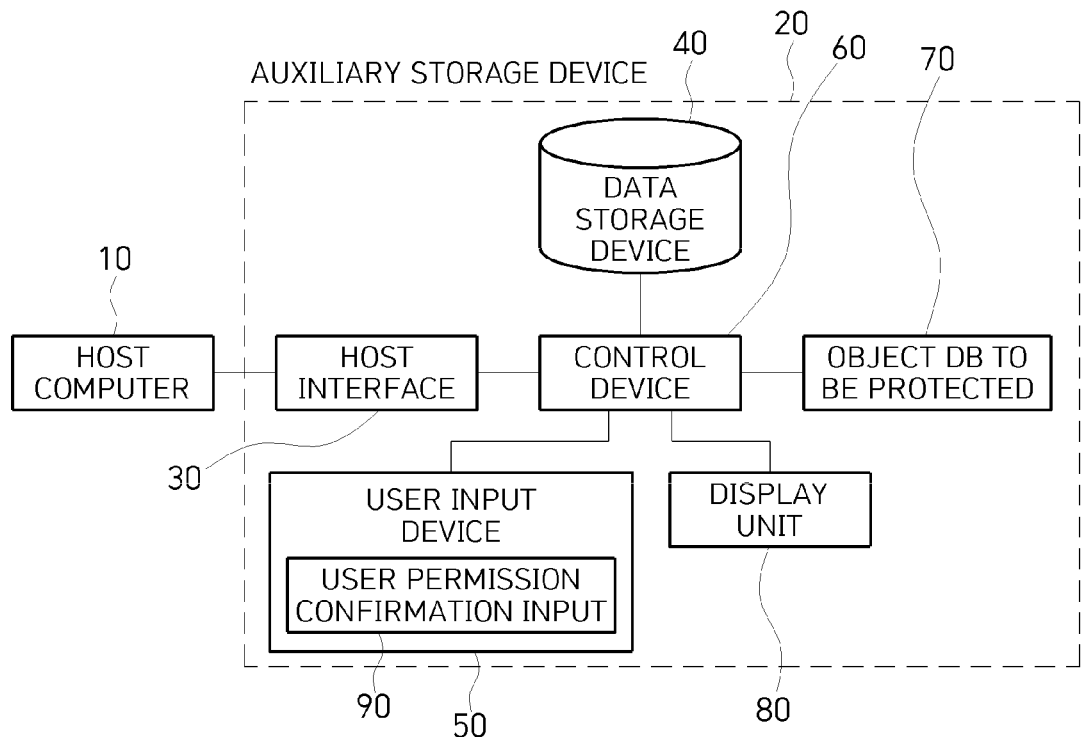
FIG. 7 is a block diagram of an auxiliary storage device according to a third embodiment of the present invention.

FIG. 7 is a block diagram of an auxiliary storage device 20 according to a third embodiment of the present invention. The third embodiment further includes a user permission confirmation input unit 90 for receiving a user permission confirmation input from the user input device 50 of the auxiliary storage device 20 of the second embodiment shown in FIG. 4. The user permission confirmation input unit 90 performs a process for a user to input whether to permit access to a corresponding address or a file system object when the protection type of the file system object is "permission confirmation" or "permission confirmation and recovery information storage."

Figure 8:
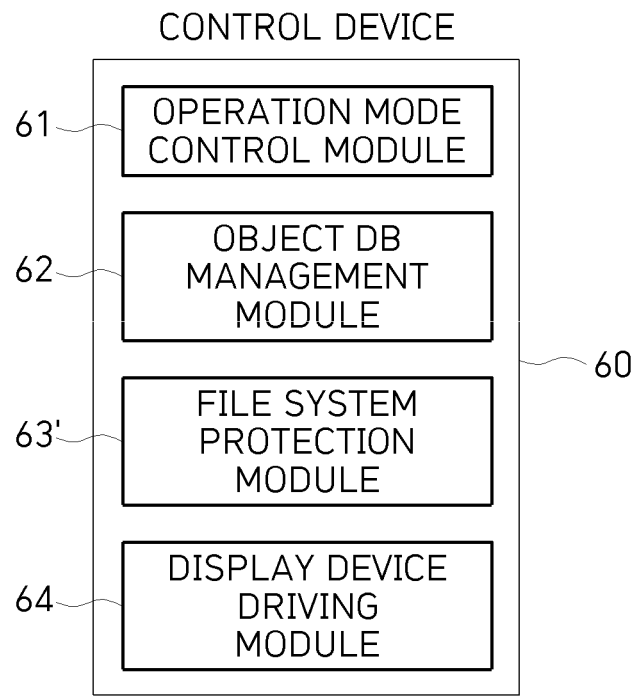
FIG. 8 is a block diagram of a control device of the auxiliary storage device according to the third embodiment.

FIG. 8 is a block diagram of a control device 60 of the auxiliary storage device 20 according to the third embodiment, and a modified file system protection module 63' is included. The file system protection module 63' includes, as shown in FIG. 9, an access information analysis unit 631 for analyzing access information provided by the host computer 10, a file system object confirmation unit 632 for confirming a file system object that is using a storage space of an access address included in the access information, a second object protection unit 636 for performing access when a permission confirmation input is received from the user input device 50, and a second protection state display unit 637 for enabling the display device driving module 64 to output the type of file system object and a permission request to the display device 80 when the confirmed file system object is an object to be protected designated by a user and the protection type is "permission confirmation" or "permission confirmation and recovery information storage."

Also, the modified file system protection module 63' in FIG. 8 may further include an access log unit 634 for creating and storing log information composed of an access time, an address, a command type, etc. Using this access log unit 634, the user may manage the log information through an app. of a mobile phone.

Figure 6:
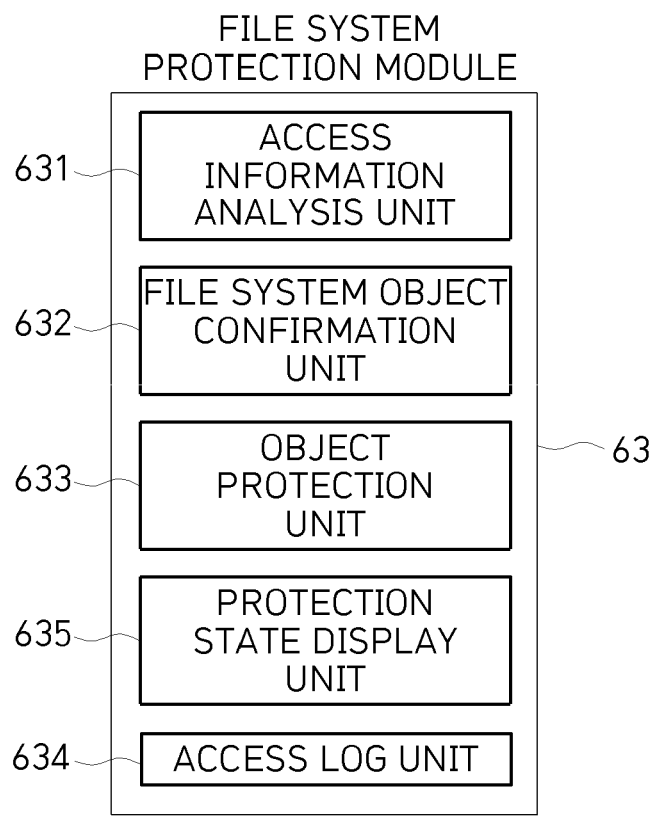
FIG. 6 is a block diagram of a file system protection module of the control device according to the second embodiment.

The protection state display unit 635 of FIG. 6 and the second protection state display unit 637 of FIG. 9 may be connected to an external terminal device such as a mobile phone. In this case, substantially, the screen of the mobile phone is the display device 80, and the input means of the mobile phone is the user input device 50. Also, an app. for processing them is executed on the mobile phone. In addition, the control device 60 is connected to the mobile phone through a communication module, and the above-described log information management is also possible with the app.

As in the afore-mentioned example, the case where a user designates a file D:/PEACE.doc as an object to be protected will be described. Here, it is assumed that D:/PEACE.doc occupies sector 100 to sector 111. Since both the read protection type and the write protection type for the file are "permission confirmation," the file system protection module 63' warns the user when there is a write or read attempt and performs a procedure for obtaining permission. For example, suppose that the host computer 10 is infected with ransomware. In this case, ransomware will try to encrypt and then delete the file. Ransomware usually damages a file in the form of overwriting in order to disable the file undeletion function of Windows. Now, suppose that the virus of the host computer 10 gives a write command to sector 100 of D:/PEACE.doc. First, the auxiliary storage device 20 confirms that the sector 100 belongs to the file system object D:/PEACE.doc, through the file system object confirmation process. Subsequently, the auxiliary storage device 20 confirms that a write operation for D:/PEACE.doc is performed with the user's permission by checking the object DB to be protected 70. Accordingly, the auxiliary storage device 20 notifies the user that a write command of the host computer 10 for the file D:/PEACE.doc has occurred, through the display device 80, and waits for permission.

The display device 80 and the user input device 50 can be replaced with an element that uses a communication module and a mobile phone, as described before. In this case, the screen of the mobile phone is used as the display device 80, and a touch screen or a key input device is used as the user input device 50. Also, an app. running on a mobile phone drives the devices so that the function of the file system protection module 63' may be implemented. That is, when a warning occurs, the app. is automatically executed to notify a user that a write command for D:/PEACE.doc has been received from the host computer 10, to display a message for asking whether the user will grant permission, and to wait for confirmation. If the user grants the permission, the write command is executed, and if the user rejects the permission, the write command of the host computer 10 on the corresponding file is rejected.

In another embodiment, the access information analysis unit 631 of the file system protection modules 63 and 63' may be implemented to analyze the file system of the host computer 10 and confirm a file system object that is using a storage space of an access address included in the access information, by using a search table including sector or cluster information allocated to a file, a directory, or the like. At this time, preferably, the search table is used after being collectively created not during a normal operation but upon booting or when the auxiliary storage device 20 is in the management mode, and is updated whenever the file system is changed.

Also, all or some functions (e.g., a function of confirming the file system object in the search table) of the file system protection modules 63 and 63' can be separately implemented as hardware or a single chip. When all of the functions are embedded in a chip, the file system protection modules 63 and 63' can be implemented by executing program codes in which the file system protection type is implemented with an independent memory, a CPU interface circuit, a high-speed computing circuit, and the like. Meanwhile, it is possible to separate only a function of confirming a file system object from the search table and implement a search-only chip with a field-programmable gate array (FPGA) and a computing core. At this time, the search-only chip includes a CPU interface circuit, a memory interface circuit independently having a shared memory or a dedicated memory and capable of accessing a memory of a CPU, and a computing core equipped with a search engine, and performs an operation of confirming a file system object using sector or cluster information on the basis of the search table.

Meanwhile, usually, Windows OS automatically executes the "chkdsk" program when receiving an answer that access is not possible from the auxiliary storage device. This operation is a natural operation of the OS to check the failure of the auxiliary storage device but is an unnecessary operation that takes a great deal of time in a structure such as the auxiliary storage device 20 of the present invention. Therefore, it would be more preferable to modify the operation so that the above operation is not performed by using an OS patch program or the like. If it is difficult to modify using the OS patch program, access may be rejected by answering, to the OS, that the write operation was successful even though the access was rejected. In this case, a problem may occur due to data inconsistency, but a user may determine that his/her computer does not perform a normal operation and thus appropriately cope with the problem, because the file has been protected and he/she has been warned about improper access. Meanwhile, in this case, the OS commands a write operation for the remaining sectors 101-111, and it is preferable to exclude an unnecessary user confirmation task by applying a user response to sector 100 to all clusters constituting the corresponding file for a certain period of time.

The above-described file system protection apparatus in the auxiliary storage device, or the auxiliary storage device to which the file system protection method is applied may be implemented to perform the above functions by being employed in electronic computing devices or computers (a personal computer (PC), a server computer, a mobile terminal, etc.) of various types and uses.

The present invention has been described in detail with reference to the preferred embodiments, but those skilled in the art can understand that the present invention may be carried out in specific forms different from those described herein without changing the technical spirit or essential features of the present invention. Therefore, the above-described embodiments are to be regarded as illustrative rather than restrictive. The scope of the present invention is defined not by the detailed description but by the following claims, and all changes or modifications within the claims and their equivalents will be construed as being included in the technical scope of the present invention.

The invention claimed is:

1. An auxiliary storage device for protecting a file system in the auxiliary storage device comprising:
    a host interface configured to communicate with a host computer;
    a data storage device configured to store data;
    a user input device configured to receive information for selecting an operation mode of the auxiliary storage device and related information from a user;
    an object database (DB) configured to indicate file system objects to be protected and protection types of the file system objects; and
    a control device configured to;
        when a command is received from the user input device, control the operation mode of the auxiliary storage device and manage the protection types of the file system objects in the object DB, and
        when a command is received through the host interface from the host computer, protect the file system objects based on the protection types of the file system objects identified in the object DB,
    wherein the operation mode comprises a normal mode in which a protection operation is performed in a case where an access target is a file system object to be protected when the host computer accesses the auxiliary storage device through the host interface, and a management mode in which a user designates the file system objects and the protection types through the user input device.

2. The auxiliary storage device of claim 1,
    wherein the protection operation is performed with reference to the protection types designated in the object DB, when access of the host computer in the normal mode is targeted to at least one of the file system objects listed in the object DB to be protected.

3. The auxiliary storage device of claim 1, wherein the control device comprises a file system protection module comprising:
    an access information analysis unit configured to analyze access information provided by the host computer;
    a file system object confirmation unit configured to confirm a file system object that is using a storage space of an access address included in the access information; and
    an object protection unit configured to selectively process access to the access address according to the protection type designated by the user when the confirmed file system object is the object to be protected designated by the user.

4. The auxiliary storage device of claim 3, wherein the file system protection module of the control device further comprises an access log unit configured to create and store log information including an access time, an address, and a command type.

5. The auxiliary storage device of claim 1, further comprising a display device configured to display a processing status of the control device.

6. The auxiliary storage device of claim 5, wherein the control device comprises a file system protection module comprising:
    an access information analysis unit configured to analyze access information provided by the host computer;
    a file system object confirmation unit configured to confirm a file system object that is using a storage space of an access address included in the access information;
    an object protection unit configured to selectively process access to the access address according to the protection type designated by the user when the confirmed file system object is the object to be protected designated by the user; and
    a protection state display unit configured to enable a display device driving module to output a type of the file system object and an access process result to the display device.

7. The auxiliary storage device of claim 1, wherein the protection types are selected from among "warning" which notifies that access to a specific file system object has occurred, "permission confirmation" which accepts access only when the user's permission is obtained, "access rejection" which indicates that access is rejected unconditionally, and "permission confirmation and then recovery information storage" which receives the user's permission, allows access, and stores recovery information of a corresponding file system object.

8. The auxiliary storage device of claim 7, wherein when the access to the specific file system object is read access, the protection type for the object to be protected includes at least one of the warning and the permission confirmation.

9. The auxiliary storage device of claim 7, wherein when the access to the specific file system object is write access, the user's permission required for the permission confirmation and the recovery information storage among the protection types of the object to be protected is triggered by an approval signal that is input from the user's mobile phone to the control device.

10. The auxiliary storage device of claim 7, wherein when the protection type of the file system object is the permission confirmation or the permission confirmation and recovery information storage, the user input device further comprises a user permission confirmation input unit for a user to input whether to permit access to an address or a file system object.

11. The auxiliary storage device of claim 10, wherein the control device comprises a file system protection module comprising:
   an access information analysis unit configured to analyze access information provided by the host computer;
   a file system object confirmation unit configured to confirm a file system object that is using a storage space of an access address included in the access information;
   a protection state display unit configured to enable a display device driving module to output a type of the file system object and a permission request to the display device when the confirmed file system object is the object to be protected designated by the user and the protection type is the permission confirmation or the permission confirmation and recovery information storage; and
   an object protection unit configured to perform access when a permission confirmation input is received from the user input device.

12. The auxiliary storage device of claim 1, wherein the data storage device of the auxiliary storage device comprises an object database (DB) configured to store addresses of objects in association with read protection methods and write protection methods for the objects,
   wherein in the object DB, an access rejection-based protection, a warning-based protection, and a permission-based protection are provided as the read protection methods, and the access rejection-based protection, the warning-based protection, and a permission and recovery information storage-based protection are provided as the write protection methods,
   wherein the warning-based protection notifies that access to a specific file system object has occurred, the permission-based protection accepts access only when the user's permission is obtained, the access rejection-based protection indicates that access is rejected unconditionally, and the permission and recovery information storage-based protection receives the user's permission, allows access, and stores recovery information of a corresponding file system object.

13. The auxiliary storage device of claim 12, wherein when the access to the specific file system object is read access, a protection type for the object to be protected includes at least one of the warning-based protection and the permission-based protection.

14. The auxiliary storage device of claim 13, wherein the user's permission required for the permission confirmation is triggered by an approval signal that is input from a user's mobile phone to the control device.

15. The auxiliary storage device of claim 12, wherein when the access to the specific file system object is write access, the user's permission required for the permission and recovery information storage-based protection is triggered by an approval signal that is input from a user's mobile phone to the control device.

16. The auxiliary storage device of claim 12, wherein when a protection type of the file system object is the permission-based protection or the permission and recovery information storage-based protection, the user input device further comprises a user permission confirmation input unit for a user to input whether to permit access to an address or a file system object.

17. A method of protecting a file system in an auxiliary storage device having a host interface configured to communicate with a host computer and a data storage device configured to store data, the method comprising:
   1) Receiving information for selecting an operation mode of the auxiliary storage device and related information from a user through a user interface;
   2) When a command is received from the user input device, controlling the operation mode of the auxiliary storage device and managing protection types of file system objects listed in an object database (DB); and
   3) When a command is received through the host interface from the host computer, protecting the file system objects based on the protection types of the file system objects identified in the object DB,
   wherein the operation mode of the auxiliary storage device comprises a normal mode in which a protection operation is performed in a case where an access target is a file system object to be protected when the host computer accesses the auxiliary storage device through the host interface, and a management mode in which a user designates the file system objects and the protection types through the user input device.

18. The method of claim 17, wherein the protection types are selected from among "warning" which notifies that access to a specific file system object has occurred, "permission confirmation" which accepts access only when the user's permission is obtained, "access rejection" which indicates that access is rejected unconditionally, and "permission confirmation and then recovery information storage" which receives the user's permission, allows access, and stores recovery information of a corresponding file system object.

19. The method of claim 18, wherein when the access to the specific file system object is read access, the protection type for the specific file system object includes at least one of the warning and the permission confirmation.

20. The method of claim 18, wherein when the access to the specific file system object is write access, the user's permission required for the permission confirmation and the recovery information storage among the protection types of the specific file system object is triggered by an approval signal that is input from the user's mobile phone to the control device.

* * * * *